June 19, 1962     E. DASH     3,040,165
METHOD OF ARC WELDING STUDS
Original Filed April 30, 1956
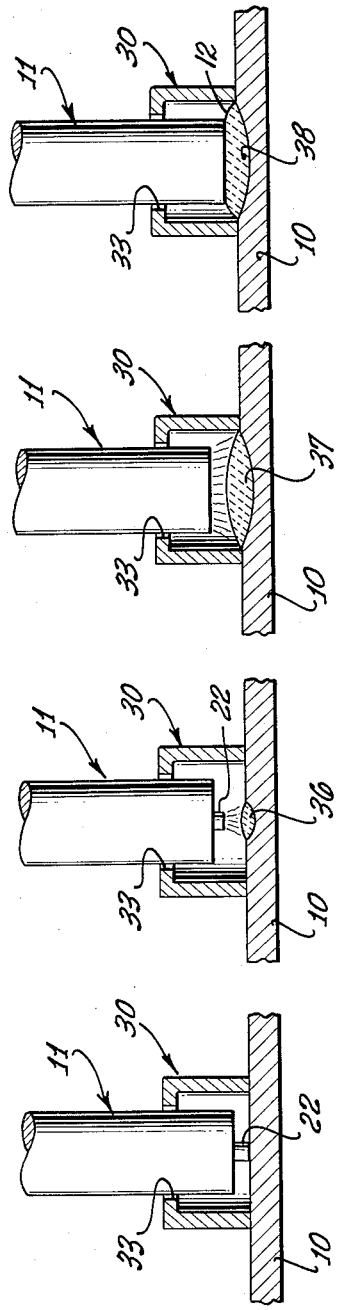
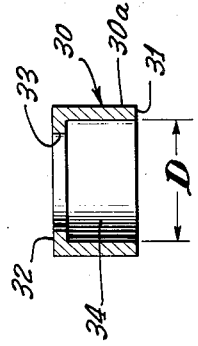
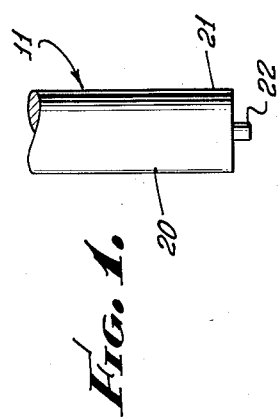
INVENTOR.
EDWARD DASH
BY
ATTORNEY.

United States Patent Office 3,040,165
Patented June 19, 1962

3,040,165
METHOD OF ARC WELDING STUDS
Edward Dash, 710 W. Columbia St., Long Beach 6, Calif.
Original application Apr. 30, 1956, Ser. No. 581,458.
Divided and this application Jan. 29, 1959, Ser. No. 789,935
14 Claims. (Cl. 219—99)

This invention relates to a method of electrical arc stud welding. This application is a divisional application of my copending application, Serial No. 581,458, filed April 30, 1956, entitled "Welding Stud Construction and Method of Arc Welding," now abandoned.

Prior proposed welding studs used with refractory ferrules for stud welding have included a welding flux at the welding end of the stud in order to facilitate and accomplish the formation of a sound weld. The provision of a welding flux on a welding end required additional machining operations at the welding end, complicated manufacture of such studs, and generally increased the cost of such studs. Prior attempted welding of a stud without welding flux and in accordance with known welding methods resulted in poor initiation and maintenance of the arc which caused the welding end to short circuit and to solidify to the work member prematurely thereby causing an unsound and a rejected weld.

Moreover, some prior ferrules used in combination with fluxed studs were provided with vents at the base of the ferrule to allow exit of gases and excess weld metal. Exit of such excess metal was often in the form of molten metal spatter which was not only a hazard to personnel, but was also a waste of weld metal. Often such excess metal caused the ferrule to lift from the work which permitted molten metal to escape from underneath the ferrule and thus defeat the purpose of the ferrule which was to confine the weld metal. Such escape of excess metal under these conditions caused unsatisfactory welds. When prior ferrules used in conjunction with these prior studs did not contain vents, excess metal and gases formed within the ferrule would also tend to lift the ferrule from the work and resulted in a dissipation of most of the effective weld metal in the form of spatter, and also produced unacceptable welds. If the ferrule did not lift from the work, the pressure of the gases sometimes would cause the weld metal to be expelled from the top axial opening of the ferrule. If the energy for such welds was reduced so that weld metal was not expelled, the resulting welds were low in strength, penetration of the work was too shallow, and fillets surrounding the weld end of the stud were improperly and non-uniformly formed.

An exemplary stud and ferrule combination which may be used with the method of this invention is described and claimed in my said copending application, Serial No. 581,458. Briefly, such a stud construction used with the method of this invention incorporates an integral projection tip which does not carry welding flux even in large stud diameters of greater than one-quarter of an inch. Welding studs employed with the method of this invention are thus economical to produce. In addition, it has been found that arc initiation and maintenance by these studs are superior, the arc being maintained in a steadier and stronger manner with resultant stronger and more uniform welds.

Ferrules used in conjunction with the abovedescribed stud and in the method of this invention are constructed so as to confine practically all of the weld metal when a wide range of welding energy is supplied and such ferrules are preferably unvented at the lower end thereof. Expulsion of weld metal from the ferrule is prevented and the ferrule-stud relation also assists in creating good arcing conditions. The ferrule construction assists in the formation of a properly formed uniform fillet around the stud, proper penetration of the work member, and strong sound welds.

The principal object of this invention is to disclose and provide a novel method of electrical arc stud welding.

Another object of this invention is to provide a novel method of electrically arc welding a novel stud provided with a projection tip and a ferrule of novel construction cooperable during welding with said stud.

Another object of this invention is to provide a method of electrical stud arc welding wherein a welding stud having a projection tip is a controlling agent in determining the effective length of an arc during the welding operation.

A further object of this invention is to disclose a method of electrical arc welding in which a stud is provided with a projection tip without flux and in which the arc is initiated and maintained in a strong and forceful manner.

Generally speaking, the method of this invention provides for the welding of a stud with an unfluxed weld end with a projection tip to a work member while the weld end of the stud is encircled by a ferrule and may comprise the steps of touching the tip to the surface of the work member within the ferrule, simultaneously moving the tip away from the surface while initiating arc formation between the tip and surface for melting the tip and for forming a small pool of molten metal on the surface, holding the weld end a preselected distance from the surface while the arc formation spreads over the end area of the weld end and opposed area of the work member to form a large pool of molten metal, and then moving the stud into the large molten pool upon cessation of the arc. The method of this invention provides for a sound weld with an unfluxed welding tip and without the attendant disadvantages of metal spatter and undesirable lifting of the ferrule.

These and many other advantages of this invention will be readily apparent from the following description and drawings illustrating the welding method of this invention.

In the drawings:

FIG. 1 is a fragmentary elevational view of an exemplary stud used in the method of this invention.

FIG. 2 is a sectional view of a ferrule used in the method of this invention.

FIG. 3a, FIG. 3b, FIG. 3c and FIG. 3d are successive fragmentary views showing steps of a welding operation in accordance with this invention and utilizing a stud and ferrule as shown in FIGS. 1 and 2.

In FIG. 1, an exemplary welding stud 11 may be made of any suitable metal such as low carbon steel and may be capable of being produced in any convenient well-known manner as by automatic screw machine methods. The welding stud 11 may comprise an elongated metal shank 20 of uniform cross section, said shank being either circular, rectangular, polygonal or other suitable cross section or shape. A welding end 21 may be provided with an integral projection tip 22 coaxial with shank 20.

The dimensions of projection tip 22 are critical. It has been found that an exemplary projection tip 22 should be, if cylindrical, approximately three thirty-seconds of an inch in diameter or less, or if other than cylindrical, have an equivalent of cross sectional area of approximately .007 square inch or less. The latter cross sectional area of .007 square inch may obtain for any diameter or cross sectional area of welding end 21.

The length of projection tip 22 is a principal factor in controlling the length of the arc and in the prevention of the short circuiting of the arc in the welding method of this invention as described later. Exemplary lengths of projection tips 22 may vary from approximately three sixty-fourths of an inch to one-eighth of an inch for studs having weld end portions of diameters varying from three-sixteenths inch to five-eighths inch, respectively.

The dimensions of a projection tip 22 are closely related to the cross sectional area of a ferrule welding chamber as later described, and the amount or volume of weld metal deposited from the welding end of the stud. I have found that for optimum welds using a minimum cross sectional area of a ferrule chamber, the volume of metal in the projection tip should be approximately ten percent or less of the total weld metal deposited, that is, the metal of the projection tip plus that metal portion (burn off length) of the weld end which becomes molten.

While the shape of the projection tip 22 is exemplarily illustrated as having a uniform circular cross section, it is understood that the shape of the projection tip is not critical but may be dome-shaped, cone-shaped, or some other desired shape. Projection tip 22 on welding end 21 serves to eliminate the necessity for a welding flux on the welding end, particularly when employed in accordance with the method of this invention described later.

The welding end 21, provided with a non-fluxed projection tip 22, is arranged in cooperative relation with ferrule 30 of a particular novel design and construction so that a stud welding operation in accordance with this invention may be performed without flux and in an improved manner. In this specification an unfluxed stud, unfluxed welding end, or unfluxed projection tip refers to a stud, end, or tip which is without any auxiliary substance of a material different than the shank welding end or projection tip of the said stud. Studs having different auxiliary substances such as aluminum attached to the stud are commonly referred to as fluxed studs. In FIG. 2, ferrule 30 may comprise a cylindrical open ended hollow body 30a provided with a plain edge face 31 which lies in a plane transverse to the axis of the ferrule body. The plain end face 31 is adapted to seat upon, in full engagement, the opposed surface of a work member 10 to which a stud 11 is to be welded. The opposite end of cylindrical body 30 is provided with an inwardly directed annular lip 32 defining an axial opening 33. The opening 33 is provided with a diameter substantially greater than the diameter of shank 20 of a stud to be used with the ferrule so that the circular edges of lip 32 will be spaced from the cylindrical surface of a shank of a stud passed therethrough. An example of such spacing is approximately one thirty-second of an inch.

The inner diameter D of the ferrule body in its relation to a welding end 21 of stud 11 to be welded is critical and is fully described in said copending application. I have found that the ratio of diameter D to the diameter of the welding end of the stud should be chosen to permit molten droplets of weld metal from the welding end of the stud to spread out thinly upon the work member and not to build up in an axial direction to the extent that a short circuit of the arc may occur by premature fusion between the welding end of the stud and the deposited metal. Thus the critical diameter D of the ferrule weld chamber is a function of the weld end diameter on the stud and of the amount of burn-off of the stud. In optimum welds, a burn-off of approximately one-eighth of an inch of the welding end of the shank is required. For such an optimum burn-off, the minimum diameter D should be the product of 1.4 times the diameter of the welding end 21 used. Preferably, the diameter D should not be greater than 1.8 times the diameter of the welding end of the shank used in order to obtain sound welds.

While the above ratios of 1.4 to 1.8 times the diameter of the welding end are usefully employed with weld ends having a projection tip of a length of approximately three-sixty fourths of an inch, I have found that if the projection tip be lengthened so that the volume of metal in the projection tip is approximately ten percent or less of the total metal deposited as defined above, then a minimum ratio of 1.2 times the diameter of the welding end may be used for determining the diameter of the weld chamber and such minimum ratio of 1.2 will not produce short circuiting of a welding arc. Thus, the range of minimum ratios lies from 1.2 to 1.8 and preferably within this range the smaller ratios may be used for large diameter studs and the larger ratios for smaller diameter studs.

I have found that if ratios greater than those described above are used, a larger burn-off from the stud becomes necessary and such results in a larger volume of weld metal being deposited in the ferrule chamber. In position welding, as when welding a stud to a vertical member, gravitational forces tend to accumulate weld metal at the bottom side of the chamber and any excessive weld metal may result in an asymmetrical and relatively weak weld. I have also found that for a stud with a given weld end diameter that the minimum ratio must be increased if the length of the projection tip is reduced. With a given weld end diameter and a given ratio, reduction of length of the projection tip will ultimately produce a condition where short circuiting of the welding arc occurs.

It will be understood that in the description above, the relationship of the welding chamber in the ferrule and the welding end of the stud has been expressed in terms of diameter and that such critical relationship may be expressed in terms of cross sectional area since the area is a function of the diameter. Thus, in terms of area, the cross sectional area of the welding chamber 34 of the ferrule should lie in the range of 1.96 to 3.24 times the cross sectional area of the welding end 21 of the stud or where the projection tip is lengthened the range may be 1.44 to 3.24.

The above description of the ferrule chamber and stud welding end relationship has been in two dimensional terms. The height of the weld chamber is also of importance and should be sufficient so as to be ineffective in confining melted metal in a longitudinal direction under conditions of welding, that is, melted weld metal is to be relatively unconfined in a vertical direction. Thus, the weld chamber in terms of three dimensional relationship with the stud welding end should have a volume related to the volume occupied by the stud welding end in the chamber whereby the differential volume is sufficient to be ineffective to confine melted metal in a direction along the axis of the stud shank under welding conditions.

It will thus be understood by those skilled in the art that when a ferrule as described above is used in the formation of a weld, the ferrule is held by well-known means and molten metal formed within the ferrule chamber is confined therewithin because the plain edge face of the ferrule rests squarely upon the work member. Since practically all of the weld metal is confined within the ferrule chamber, an effective use is made of such weld metal and a stronger weld is formed. The axial opening 33 at the top of the weld chamber permits escape of gases therefrom and since there is an outgoing of gases through the space provided by opening 33, oxidation of molten metal during the arc period is substantially reduced because access of air to the weld area is restricted. The internal welding chamber of the ferrule is of sufficient height so that the ferrule is prevented from lifting off the work member because of additional weld metal deposited from increased power input or other causes.

When welding a stud 11 embodying this invention together with a ferrule 30, it is understood that a source of welding current is available as well as a timer and contactor unit to control duration of the welding current. This welding equipment is well-known in the welding art and therefore is not shown or described. The stud 11 may be held by a stud welding gun of well-known form, the chuck of said gun holding the stud at the fastening end. A ferrule 30 may be positioned on the workpiece with the stud centered as indicated in FIG. 3a and the ferrule held by a ferrule holder (not shown). It is understood that welding end 21 of stud 11 is a non-fluxed end and that as shown in FIG. 3a, projection tip 22 initially contacts a work member such as 10.

Upon closure of a starting switch, welding current begins to flow and the stud welding gun mechanism begins to lift or retract the stud from the surface of the work member. As the stud is lifted, an arc is simultaneously formed between the work member and the projection tip of the stud. The distance through which the stud is lifted is predetermined and may usually be approximately one-sixteenth of an inch. The generation of an arc between projection tip 22 and the work member melts the projection tip and also melts an area on the work member opposite the projection tip. A small raised pool 36, as shown in FIG. 3b, of molten metal, somewhat larger than the original diameter of the projection tip, and of more than superficial depth is thus formed on the work member. Virtually all of the melted tip metal is deposited in this small pool and the raised portion of the pool comprises substantially the volume of metal deposited from the tip. The heat from this small pool of molten metal preheats adjacent portions of the work member by conduction. (It will be noted that heat from the arc is confined within the ferrule and that circulation of air within the ferrule is substantially eliminated because of the solid seating of end face 31 of the ferrule on the work member.) By the time the stud has been retracted to its maximum retracted position (has moved approximately one-sixteenth of an inch), the projection tip should be just about completely melted. Preferably, complete melting of the projection tip should occur at the moment of maximum retraction or just thereafter, such timing producing a strong forceful arc between the stud and the work member. At the moment of maximum retraction and complete melting of the projection tip, it will be noted that the welding end is now spaced a distance equal to the sum of the one-sixteenth of an inch retraction due to the gun mechanism and also the length of the original projection tip 22 of the stud. This sum is defined as the effective arc length of stud during the weld; such effective arc length being controlled by the length of the projection tip for a constant gun retraction. The preheating of the work member by the small pool of molten metal, the confinement of the heat of the arc, and establishment of a strong arc during retraction, produce a condition which causes the welding end of the stud to be immersed in a centrally established arc which spreads to the full cross-sectional area of the welding end and to a corresponding area on the work member as shown in FIG. 3c. A portion (burn-off of about one-eighth of an inch) of the welding end of the stud melts under the action of the arc and the work member opposed to said end is brought up to molten temperature, thereby forming an enlarged pool 37, as in FIG. 3c, of metal on the member directly opposite the welding end of the stud and bounded laterally by the wall of the ferrule. The enlarged molten pool thus comprises metal melted from the projection tip, from the weld end of the stud, and from the work member, such molten metal penetrating the work member to a considerable depth and being more than superficial melting of such metal. Since the projection tip and the stud are composed of the same material the temperature of the arc is virtually uniform throughout the arcing period. No foreign metals are present and therefore the molten pool contains no foreign metals.

After a predetermined time has elapsed, which is automatically controlled in well-known manner by the timer unit, the welding current flow is stopped by opening of the contactor and the stud is plunged downwardly by the stud gun mechanism into the molten pool of metal and a weld 38, as in FIG. 3d, is consummated between the stud and the work member when the molten pool solidifies. The ferrule remains around the weld area as the stud gun is lifted and the chuck of the gun is disengaged from the welded stud.

It will be noted that when stud 11 is plunged into the molten metal pool 37 the entire cross-section of the welding end 21 of the stud is enveloped by molten metal and becomes welded to the work member upon solidification of the molten metal. Some of the molten metal is displaced to form a fillet weld 12 surrounding the stud and is fused both to the stud and work member. This fillet 12 which is molded and laterally confined by the weld chamber wall of ferrule 30 has a diameter substantially the same as that of the diameter "D" of the weld chamber. As shown in FIG. 3d, the height of the fillet is substantially less than the height of the weld chamber because the weld chamber does not mold or confine the formation of the fillet in the longitudinal direction.

After welding the overall length of the stud is shorter than the original overall length by an amount equal to the amount of the projection tip 22 and a length on the weld end 21 referred to as the "burn-off length." This shortening of the stud is caused by displacement of the molten metal as described above into the fillet. Exemplary burn-off lengths may vary from approximately one-sixteenth of an inch to one-eighth of an inch for studs having weld end diameters varying from three-sixteenths of an inch to five-eighths of an inch respectively.

It is important to note that during the stud welding operation, the ferrule prevents any splatter of metal because of its solid face-to-face contact with the surface of the metal. The ferrule thus confines the molten pool and assists in producing a solid, uniform, dense weld. During the welding operation described above, it will be noted that gases formed during the process are permitted to escape essentially through the axial port 32 of the ferrule. The heat and the pressure of gases within the ferrule chamber thus tend to prevent entrance of air into the ferrule and oxidation of the molten pool of metal is thereby reduced to a minimum. It should be noted also that the critical diameter of the weld chamber of the ferrule permits the molten metal to flow laterally within predetermined limits, and that the internal height of the weld chamber of the ferrule is sufficient so as to be ineffective in confining molten metal of the pool in a direction longitudinally of the weld chamber. It will be understood that the available space within the weld chamber during welding of the stud is occupied not only by the molten metal at the surface of the work member but also by gases created by the welding operation. Such gases exert a pressure on the melted metal which is a function of the differential volume or available space within the chamber and of the looseness of fit of opening 33 which permits restricted escape of gases longitudinally along the shank of the stud.

If the volume of molten weld metal is predetermined to be a selected amount, then a given diameter or cross sectional area of the weld chamber will permit the given volume of molten weld metal to be of a selected height. If the diameter is increased, then the height of the molten metal will be decreased. Therefore, a preselected diameter D of the weld chamber is an important factor in controlling the distance or actual arc length between the welding end of the stud and the molten metal during the arcing period.

Also, it is important to note that the preselected length of the projection tip of the stud also serves to control the length of arc between the welding end of the stud and the molten pool of metal, after the projection tip has melted. With a given distance of retraction of the gun mechanism, the longer the projection tip, the farther away from the melted metal the welding end of the stud will be, and the longer the length of the arc will be. In other words, the length of the projection tip is directly proportional to the actual arc length between the welding end of the stud and the molten metal. This feature is new and very useful because in some applications of stud welding where a different arc length is required, the arc length may be easily changed by selecting a stud having a projection tip of different length. By the combination of a preselected internal diameter of the ferrule chamber and a preselected length of projection tip, the welding end of the stud can be made to remain far enough away from the molten metal during the entire arcing period, so that the arc is maintained in a strong unwavering manner. Short circuiting to the work member is thus prevented, a condition which would cause the stud to prematurely solidify to the work member. I have found that by using this welding method with a projection tipped welding stud, and a ferrule of the type described, that even in welding studs having a diameter greater than a quarter of an inch a welding flux was not necessary to obtain sound welds. In addition, a fillet of uniform section, shape and density is formed around the weld end of the stud by the selected lateral confinement of molten metal under selected gas pressure as determined by the differential volume or available space in the weld chamber. Virtually no expulsion of weld metal occurs from the ferrule chamber, and deep penetration of the work member is obtained. Initiation of the arc is strong and forceful at the projection tip because of the high current density occurring on the small cross section of the tip throughout its length. All these factors contributed to consistently strong, sound welds under a wide range of welding energy conditions.

It is understood that various modifications and changes may be made in the welding method described above, and all such changes and modifications coming within the scope of the appended claims are embraced thereby.

I claim:

1. A method of welding a stud having a non-fluxed welding end with a projection tip of the same material as the stud of preselected length to a surface of a work member, said stud and work member being of electrical conducting material, comprising the steps of: introducing the welding end and projection tip into a chamber of preselected volume; touching the tip to said surface; flowing an electric current through the welding end and the work member while simultaneously retracting the welding end a preselected distance from the surface to establish an arc between the tip and the surface; melting the tip to form on the surface a small raised pool of molten metal consisting of the entire melted tip and a small opposed portion of the work member; holding the welding end at said preselected retracted distance while the arc spreads over the entire end area of the welding end and opposed area of the work member to form a substantially larger pool of molten metal on the surface; said arc then having an effective arc length substantially equal to the sum of the length of the tip and the distance the welding end was retracted; melting a preselected portion of the welding end of the stud; and then moving the stud into said molten pool upon cessation of the arc.

2. A method of welding a stud to a surface of a work member as stated in claim 1 including the step of confining in said chamber molten metal in a lateral direction and at a preselected area upon said surface, said area being not less than 1.4 times the cross sectional area of said welding end.

3. A method of welding a stud having an unfluxed welding end provided with a projection tip of the same material as the stud and of preselected length to a surface of a work member, said stud and work member being of electrical conducting material, comprising the steps of: enclosing said welding end and tip at and adjacent to said surface; touching the projection tip to the surface of the work member; flowing an electric current through the stud and the work member; retracting the stud a preselected distance from the surface to initiate an arc between said tip and said surface; melting substantially the entire tip during said retraction to form a small raised pool of molten metal on the surface; said molten metal consisting of the volume of metal deposited from the tip and a small opposed portion of the work member; spreading the arc to the welding end of the stud and opposed area of the work member to form a larger pool of molten metal on the surface; confining lateral flow of said molten metal while the height of the molten metal and its spacing from said welding end permits maintenance of the arc during the arcing period; and then plunging the stud into said molten pool of metal upon cessation of the arc.

4. A method of arc welding to a surface of a work member, a metal stud having a welding end provided with a projection tip having only the same material as the stud and having a volume approximately ten percent or less of a preselected total volume of weld metal to be deposited from the stud during the weld and of selected length and encircled by a ferrule, comprising the steps of: touching the projection tip to the surface of the work member within the ferrule; initiating arc formation between the tip and surface while simultaneously moving the tip away from the surface and melting the tip during such movement to form a small pool of molten metal on said surface for preheating the opposed area of the work members; said molten metal comprising virtually all of the metal in the tip and metal from a small opposed portion of the work member, holding the stud a preselected distance from the surface while said arc formation spreads to the end area of the welding end and the opposed area of the work member is brought to molten temperature to form a larger pool of molten metal under selected pressure of weld gases; said arc being maintained at substantially the same arc temperature throughout the arcing period; and then plunging said stud into said molten pool upon cessation of the arc.

5. A method as stated in claim 4 including the step of confining the molten metal to an area upon said surface, the area being not less than 1.4 times the cross-sectional area of the welding end.

6. A method as stated in claim 4 including the step of containing all of the molten weld metal in an area upon said surface, said area being not greater than 3.24 times the cross-sectional area of the welding end.

7. A method of electrically arc welding to a surface of a work member a metal stud having a shank with a welding end provided with projection tip of the same material as the shank and encircled by a ferrule comprising the steps of: touching the tip to the surface of the work member within the ferrule; moving the tip away from the surface and simultaneously initiating arc formation between the tip and surface for melting the tip and for forming a small raised pool of molten metal on said surface; said raised pool of metal consisting of virtually all of said tip metal and a portion of the metal of the work member; holding the stud a preselected distance from the surface while said arc formation spreads to the end area of the shank and opposed area of the work member to form a large pool of molten metal; moving said stud into said molten pool upon cessation of the arc; and directing the flow of weld gases along the shank.

8. A method of welding as stated in claim 7 including the step of restraining lateral flow of molten metal to confine all molten metal in a selected area at said surface.

9. A method of welding a stud having a welding end with a projection tip of the same material as said stud and of preselected length to a surface of a work member, said stud and work member being of electrical conducting material, comprising the steps of: introducing said welding end and projection tip into a chamber for enclosing said welding end at said surface; spacing said projection tip from said surface; applying an electrical potential between the tip and the surface sufficient to establish an arc therebetween; forming a small pool of molten metal on said surface by melting all of the metal of said tip; said small pool having substantial penetration into the work member; forming a larger pool of molten metal on said surface by melting a portion of said welding end above said tip; said arc having an effective arc length substantially equal to the sum of the length of said projection tip and the space between said tip and said surface; holding the stud stationary during the arcing period and then moving the stud into said molten pool upon cessation of the arc.

10. A method of electrically arc welding to a surface of a work member a metal stud having a shank with a non-fluxed welding end terminating in an integral projection tip of the same material as said shank and of preselected length, said stud and work member being of electrical conducting material, comprising the steps of: enclosing said welding end at and adjacent to said surface; establishing an electrical arc between the tip and the surface; melting all of the metal of the tip to form a small raised pool of molten metal on the surface; said pool including molten metal from a small portion of the work member; spreading the arc to the welding end area to form a larger pool of molten metal on the surface, said small pool having substantial penetration into the work member, simultaneously spacing the welding end sufficiently from the work member to prevent short circuiting and premature solidification of the stud to said member, said spacing being directly proportional to said preselected length of the projection tip; continuing to melt the welding end for a preselected period of time; holding the stud stationary while the arc continues to melt the welding end, interrupting the arc at the end of said preselected period of time; and then moving the stud into said molten pool.

11. A method of electrically arc welding a stud having a non-fluxed welding end provided with an integral projection tip to a surface of a work member, comprising the steps of: positioning said welding end and projection tip at the surface of the work member; enclosing said welding end and providing a selected volume of space around said welding end; initiating an electrical arc between said tip and said surface for melting virtually all of said tip while simultaneously moving said tip away from said surface a preselected distance and to form a small raised pool of molten metal; said molten metal including substantially all of the melted tip and opposed portion on the work member; maintaining said arc after said tip is melted and enlarging the maintained arc to cover the end area of the welding end while melting a portion of said welding end and forming a large pool of molten metal; laterally confining said large pool of molten metal while subjecting the same to preselected pressure of gases within said volume of space; whereby the effective arc length is substantially equal to the length of said projection tip and the distance said welding end was moved and maintaining virtually the same arc temperature throughout the arcing period; and then plunging the welding end into said molten pool upon cessation of the arc.

12. A method of electrically arc welding a stud having a welding end provided with a projection tip of the same material as the stud and of selected length to a surface of a work member, comprising the steps of: positioning said welding end and projection tip at the surface of the work member; enclosing said welding end and providing a selected volume of space around said welding end; initiating an electric arc of selected temperature between said tip and said surface for melting substantially all of said tip while simultaneously moving said tip away from said surface a preselected distance; maintaining said arc at said temperature after said tip is melted and enlarging the maintained arc to cover the end area of the welding end while melting a portion of said welding end; laterally confining a pool of molten metal whereby the actual arc length during the weld is equal to the distance between the surface of said pool and the molten end of the stud, said actual arc length being proportional to the length of said tip; and then plunging the welding end into said molten pool upon cessation of the arc.

13. A method of electrically arc welding a non-fluxed metal stud having a welding portion with a projection tip of the same material as said portion to a surface of a work member comprising the steps of: positioning said tip at said surface of the work member; enclosing said welding portion and providing a selected volume of space around said welding portion; establishing an electrical welding arc between said tip and said surface; maintaining said welding arc while said welding portion is melted to form an ultimate pool of molten metal on said work member and including only the metal of the welding portion, tip, and work member; said ultimate pool having a substantial penetration into the work member; confining lateral flow of said molten metal on the surface to the lateral cross sectional area of said space; holding the stud stationary while the welding portion is melted; interrupting the arc; and then moving said stud into said molten pool.

14. A method of electrically arc welding a non-fluxed metal stud having a welding portion with a projection tip of the same material as said portion to a surface of a work member comprising, the steps of: positioning said tip at said surface of the work member; enclosing said welding portion and tip and providing a selected volume of space therearound; establishing an electrical welding arc between said tip and said work surface; maintaining said welding arc while said tip is melted to first form a small pool of molten metal and while said welding portion is melted to form with said small pool an ultimate pool of molten metal including the metal of the tip, welding portion and work member, said small and ultimate pools affording substantial penetration into the work member; holding the stud stationary while melting of the welding portion is completed; interrupting the welding arc upon completion of melting of the welding portion; and then moving said stud into said molten pool.

References Cited in the file of this patent
UNITED STATES PATENTS

| | | |
|---|---|---|
| 2,413,189 | Nelson | Dec. 24, 1946 |
| 2,462,882 | Martin | Mar. 1, 1949 |
| 2,485,357 | Candy | Oct. 18, 1949 |
| 2,518,463 | Graham | Aug. 15, 1950 |